UNITED STATES PATENT OFFICE.

STEWART R. BARNETT, OF ALBANY, WISCONSIN, ASSIGNOR TO CRARY BROKERAGE COMPANY, OF WAUKESHA, WISCONSIN, A CORPORATION OF WISCONSIN.

FOOD.

1,230,817.  Specification of Letters Patent.  Patented June 19, 1917.

No Drawing.  Application filed June 26, 1916.  Serial No. 106,015.

*To all whom it may concern:*

Be it known that I, STEWART R. BARNETT, a citizen of the United States, residing at Albany, in the county of Green and State of Wisconsin, have invented a new and useful Food, of which the following is a specification.

The object of my invention is to produce, in commercial form, a stable concentrated food product which, when diluted with water, will prove satisfactory as a food for babies and invalids, especially those who are in a condition of "fat intolerance", and, in some cases, those who require an assimilated hematinic food.

This concentrated food product comprises concentrated cow's milk (either whole or skim); malt soup extract, preferably alkaline; an alimentary vegetable oil, such as olive oil, and preferably one from which the free fatty acids have been removed; and finally, if desired, peptonized iron.

In preparing this food product I preferably use (1) approximately 79.63%, more or less, of cow's milk (whole or skim) concentrated by any well known process. This concentrate should be warmed or taken directly from the concentrating apparatus and to it is added, by mechanical agitation (2) 16.66%, more or less, of a malt soup extract, preferably alkaline.

"Malt soup extract", in its present usual commercial form, is a combination of dextro-maltose and potassium carbonate, and gives an acid reaction, although it is not readily fermentable in its concentrated form. When diluted with water or milk or concentrated milk, however, it becomes more readily affected by micro-organisms and yeasts. In order, therefore, to make this material available for my stable product, it is necessary to render the dextro-maltose compound clearly non-acid and preferably alkaline, in order to neutralize, at least in part, the acidity of the milk concentrate. This non-acid or alkaline product may be produced by any desirable neutralizing agent, such, for instance, as suitable carbonates or oxids of alkalis or alkaline earths.

To the mixture comprising the elements (1) and (2) as above described, is added (3) approximately 3.7% (more or less in order to make the combined fat ingredients preferably from 9.5% to 10.5% of the whole) of an alimentary vegetable oil from which have been removed the free fatty acids. The addition of the oil is accomplished preferably by introduction through a small pipe lying within a larger pipe, after the manner of an inspirator. These two pipes are so arranged that simultaneous flow therethrough may be accurately graduated and the mixture composed of the two elements (1) and (2) is delivered to the larger pipe. The two pipes deliver to any standard homogenizer and, by the arrangement described, the oil reaches the homogenizer in the form of a core to an envelop of milk and is thus at all times accurately proportioned so that the homogenized product is thoroughly uniform. Ordinary bulk mixing of the oil with the milk before concentration, or with the concentrated milk, will not give the most satisfactory results. Care should be exercised in the full removal of the free fatty acids from the oil, as otherwise the product is apt to have a disagreeable taste, especially if kept for any considerable time.

The homogenized compound, above described, should be cooled to approximately 42 degrees Fahrenheit, or lower, and thereupon (4) peptonized iron is added by mechanical agitation. There are at the present time two well known brands of peptonized iron on the market, one containing 25% of ferric oxid and the other containing 5% of ferric oxid. If the first brand is used, about $\frac{1}{50}$ of 1% is added to compound (1), (2), (3), while if the second brand is used, the quantity is about $\frac{1}{10}$ of 1%. These quantities may be varied within reasonable limits.

It is highly important that the introduction of the peptonized iron be carefully performed and the most satisfactory results are obtained if it is first mixed to a small quantity of the homogenized compound and then mixed with the total bulk. If the addition is made while the homogenized compound is warmer than 42 degrees Fahrenheit a digesting action begins which tends to alter the proteins and produce coagulation, whereas, if the compound is first cooled, this danger, either at the time of mixture, or during the later sterilization, is avoided.

The proportion of the oil may be varied, depending largely upon the quantity of fat in the concentrated milk, but for ordinary purposes the intention is that the total fat content (both animal and vegetable) shall be sufficient to produce, when diluted with water in the ordinary manner, a milk which, in its proportions, shall closely approach mother's milk.

While any one of the alimentary vegetable fats may be used, I consider, at the present time, that olive oil is preferable because of its generally-recognized laxative and nutritive value.

The peptonized iron is used because of the character of its iron content rather than for the peptones.

The homogenization should be carried out at as high a pressure as the milk will stand.

It will be readily understood that, both because cow's milk naturally varies to a considerable extent in its cream content, and also because at times a greater or less residue of natural cream may be desired in the product, the compound which has heretofore been described may contain a greater or lesser percentage of cream and that, therefore, the cow's milk may be used either whole or skimmed to a greater or lesser extent. The term "milk" used in the claims, therefore, is intended to mean either whole milk or milk from which some of the natural cream content, or even practically all of the natural cream content, has been removed.

I claim as my invention:—

1. A food product comprising an homogenized compound of concentrated cow's milk; alkaline malt soup extract; olive oil; and peptonized iron.

2. A food product comprising an homogenized compound of concentrated cow's milk; malt soup extract; olive oil; and peptonized iron.

3. A food product comprising an homogenized compound of concentrated cow's milk; alkaline malt soup extract; and olive oil.

4. A food product comprising an homogenized compound of concentrated cow's milk; non-acid malt soup extract; olive oil; and peptonized iron.

5. A food product comprising an homogenized compound of concentrated cow's milk; non-acid malt soup extract; and olive oil.

6. A food product comprising an homogenized compound of concentrated cow's milk; alkaline malt soup extract; olive oil from which the free fatty acids have been removed; and peptonized iron.

7. A food product comprising an homogenized compound of concentrated cow's milk; alkaline malt soup extract; and olive oil from which the free fatty acids have been removed.

8. A food product comprising an homogenized compound of concentrated cow's milk; malt soup extract; olive oil from which the free fatty acids have been removed; and peptonized iron.

9. A food product comprising an homogenized compound of concentrated cow's milk; non-acid malt soup extract; olive oil from which the free fatty acids have been removed; and peptonized iron.

10. A food product comprising an homogenized compound of concentrated cow's milk; non-acid malt soup extract; and olive oil from which the free fatty acids have been removed.

11. A food product comprising concentrated cow's milk; alkaline malt soup extract; an alimentary vegetable oil from which the free fatty acids have been removed; and peptonized iron.

12. A food product comprising concentrated cow's milk; alkaline malt soup extract; and an alimentary vegetable oil from which the free fatty acids have been removed.

13. A food product comprising concentrated cow's milk; malt soup extract; an alimentary vegetable oil from which the free fatty acids have been removed; and peptonized iron.

14. A food product comprising concentrated cow's milk; non-acid malt soup extract; an alimentary vegetable oil from which the free fatty acids have been removed; and peptonized iron.

15. A food product comprising concentrated cow's milk; non-acid malt soup extract; and an alimentary vegetable oil from which the free fatty acids have been removed.

16. A food product comprising concentrated cow's milk; alkaline malt soup extract; an alimentary vegetable oil; and peptonized iron.

17. A food product comprising concentrated cow's milk; alkaline malt soup extract; and an alimentary vegetable oil.

18. A food product comprising concentrated cow's milk; malt soup extract; and alimentary vegetable oil; and peptonized iron.

19. A food product comprising concentrated cow's milk; non-acid malt soup extract; an alimentary vegetable oil; and peptonized iron.

20. A food product comprising concentrated cow's milk; non-acid malt soup extract; and an alimentary vegetable oil.

21. A food product comprising an homogenized compound of concentrated cow's milk; alkaline malt soup extract; olive oil; and peptonized iron added to the other ingredients after said ingredients have been reduced to a temperature as low as approximately 42 degrees Fahrenheit.

22. A food product comprising an homogenized compound of concentrated cow's milk; non-acid malt soup extract; olive oil; and peptonized iron added to the other ingredients after the said ingredients have been reduced to a temperature as low as approximately 42 degrees Fahrenheit.

23. A food product comprising an homogenized compound of concentrated cow's milk; malt soup extract; olive oil; and peptonized iron added to the other ingredients after said ingredients have been reduced in temperature as low as approximately 42 degrees Fahrenheit.

24. A food product comprising an homogenized compound of concentrated cow's milk; alkaline malt soup extract; olive oil from which the free fatty acids have been removed; and peptonized iron added to the other ingredients after said ingredients have been reduced to a temperature as low as approximately 42 degrees Fahrenheit.

25. A food product comprising an homogenized compound of concentrated cow's milk; non-acid malt soup extract; olive oil from which the free fatty acids have been removed; and peptonized iron added to the other ingredients after the said ingredients have been reduced to a temperature as low as approximately 42 degrees Fahrenheit.

26. A food product comprising an homogenized compound of concentrated cow's milk; malt soup extract; olive oil from which the free fatty acids have been removed; and peptonized iron added to the other ingredients after the said ingredients have been reduced to a temperature as low as approximately 42 degrees Fahrenheit.

27. A food product comprising an homogenized compound of concentrated cow's milk; alkaline malt soup extract; an alimentary vegetable oil; and peptonized iron added to the other ingredients after the said ingredients have been reduced to a temperature as low as approximately 42 degrees Fahrenheit.

28. A food product comprising an homogenized compound of concentrated cow's milk; non-acid malt soup extract; an alimentary vegetable oil; and peptonized iron added to the other ingredients after the said ingredients have been reduced to a temperature as low as approximately 42 degrees Fahrenheit.

29. A food product comprising an homogenized compound of concentrated cow's milk; malt soup extract; an alimentary vegetable oil; and peptonized iron added to the other ingredients after the said ingredients have been reduced to a temperature as low as approximately 42 degrees Fahrenheit.

30. A food product comprising an homogenized compound of concentrated cow's milk; alkaline malt soup extract; an alimentary vegetable oil from which the free fatty acids have been removed; and peptonized iron added to the other ingredients after said ingredients have been reduced in temperature as low as approximately 42 degrees Fahrenheit.

31. A food product comprising an homogenized compound of concentrated cow's milk; non-acid malt soup extract; an alimentary vegetable oil from which the free fatty acids have been removed; and peptonized iron added to the other ingredients after said ingredients have been reduced to a temperature of approximately 42 degrees Fahrenheit.

32. A food product comprising an homogenized compound of concentrated cow's milk; malt soup extract; an alimentary vegetable oil from which the free fatty acids have been removed; and peptonized iron added to the other ingredients after said ingredients have been reduced to a temperature of approximately 42 degrees Fahrenheit.

In witness whereof, I have hereunto set my hand at Indianapolis, Indiana, this second day of June, A. D. one thousand nine hundred and sixteen.

STEWART R. BARNETT.